Figure 2:
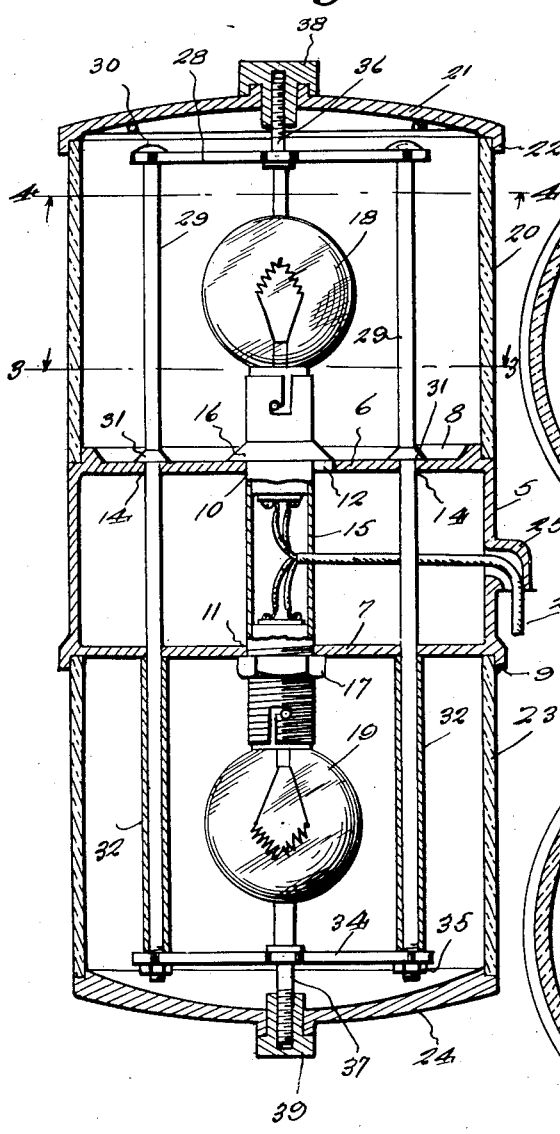

Nov. 5, 1929.  B. H. ALSOP  1,734,512
AUTOMOBILE TURNING SIGNAL
Filed Feb. 8, 1929  2 Sheets-Sheet 1
Fig. 1.
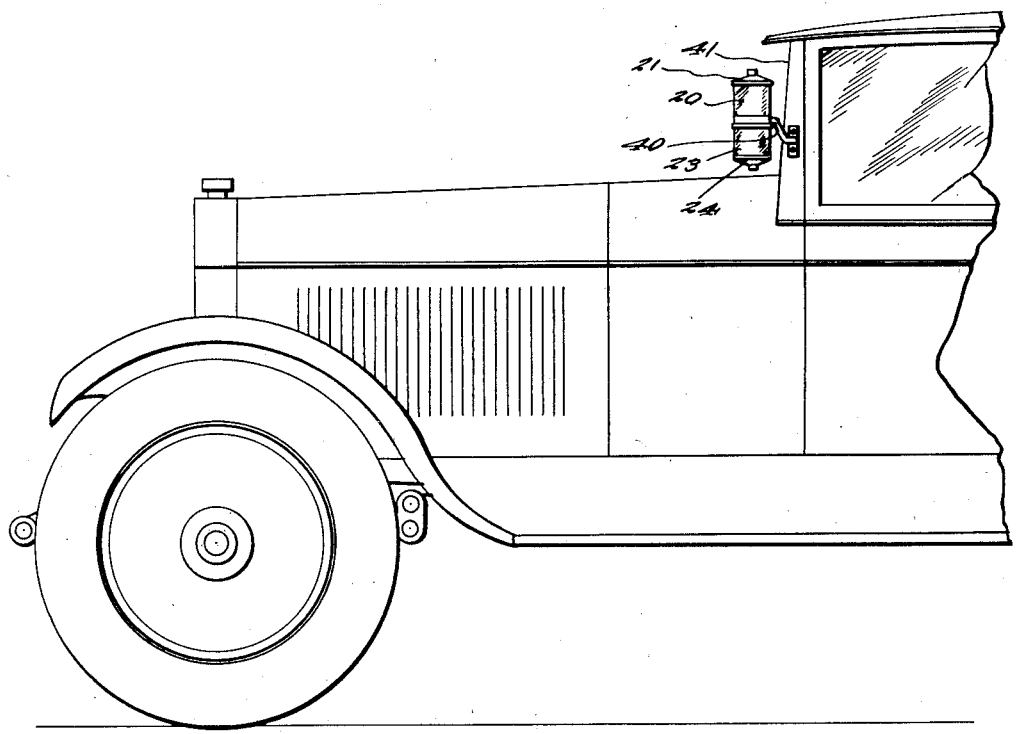
Fig. 5.  Fig. 6.
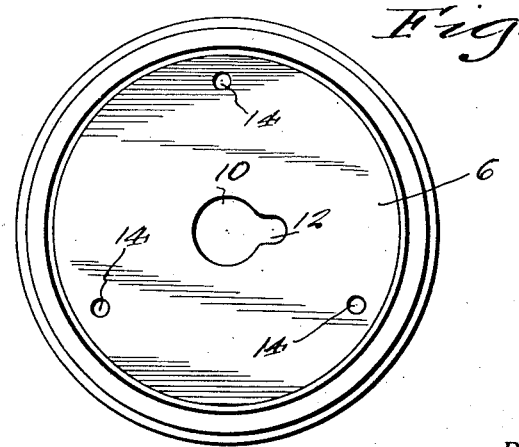 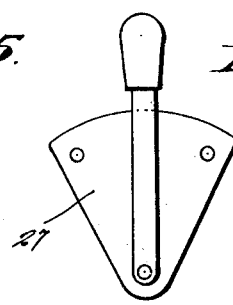
Inventor
B. H. Alsop
By *Clarence A. O'Brien*
Attorney Nov. 5, 1929.  B. H. ALSOP  1,734,512
AUTOMOBILE TURNING SIGNAL
Filed Feb. 8, 1929   2 Sheets-Sheet 2

Inventor
B. H. Alsop.
By Clarence A. O'Brien
Attorney

Patented Nov. 5, 1929

1,734,512

UNITED STATES PATENT OFFICE

BENNIE H. ALSOP, OF TILLAMOOK, OREGON

AUTOMOBILE TURNING SIGNAL

Application filed February 8, 1929. Serial No. 338,457.

The present invention relates to an automobile turning signal and has for its prime object to provide an illuminated signal which may be mounted to the front left hand portion of an automobile with varied colored lights incorporated therein that may be illuminated to give the signals to pedestrians and oncoming vehicle drivers as well as to those in the rear.

Another very important object of the invention resides in the provision of a signal of this nature which is simple in its construction, inexpensive to manufacture, easy to assemble and disassemble, thoroughly efficient and reliable in use and operation, and otherwise well adapted to the purpose for which it is designed.

With the above and numerous other objects as will appear as the description proceeds, the invention resides in certain novel features of construction, and in the combination and arrangement of parts as will be hereinafter more fully described and claimed.

Figure 3:
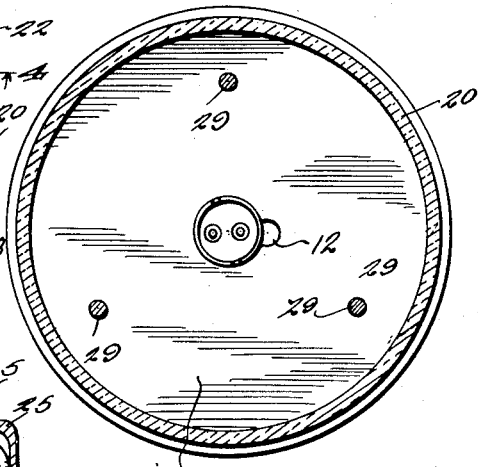
Figure 4:
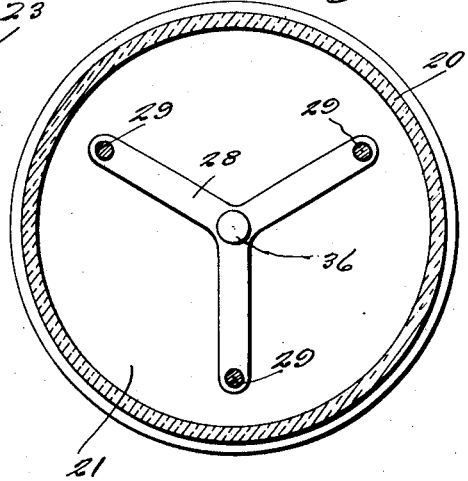

In the drawing:

Figure 1 is a side elevation of the forward portion of an automobile showing my signal device thereon, Figure 2 is a vertical section through the signal, Figures 3 and 4 are transverse sections therethrough taken substantially on the lines 3—3 and 4—4 respectively of Figure 2, Figure 5 is a top plan view of the core, and Figure 6 is an elevation of a switch.

Referring to the drawing in detail it will be seen that the numeral 5 denotes a cylindrical core with top plates 6 and bottom plates 7. The top plate 6 is provided with annular shoulder 8 spaced slightly inwardly from the periphery thereof.

The plate 7 is provided with an annular depending flange 9 at the periphery thereof. Plates 6 and 7 have central registering openings 10 and 11 respectively, the former being provided with a notch like extension 12.

The plates 6 and 7 are provided with registering off center apertures 14, in the present instance three in each plate.

A double electric socket 15 is mounted in openings 10 and 11 having a shoulder 16 resting on the plate 6 and a nut 17 is threaded on the lower end of the double electric socket to engage the under surface of the plate 7 for locking the double socket in place.

Electric bulbs 18 and 19 are engaged in the socket in the usual well known manner. A cylinder of glass or other transparent material is denoted by the numeral 20 and has its lower end disposed about the shoulder 8. A cap 21 is disposed on the upper end of the cylinder 20 and has an annular depending flange at its periphery as disposed at 22 to telescope over the upper end of the cylinder 20.

A cylinder of glass or other transparent material is denoted by the numeral 23 and the upper end thereof is received within the flange 9. A cap 24 abuts the lower end of the cylinder 23. The cylinder 20 is preferably red while the cylinder 23 is preferably green. The core 5 is provided with a protected opening 25 so that wiring 26 may be passed therethrough and engaged with the double socket 15.

This wiring is associated with suitable switch structure 27 which will be located conveniently in the automobile so that the desired bulb 18 or 19 may be illuminated. A three arm spider 28 has apertured ends through which tie rods 29 pass. These tie rods have heads 30 at their upper ends, shoulders 31 intermediate their ends to abut the plate 6 and pass through the openings 14.

In the cylinder 23 there are disposed on the tie rods sleeves 32. A three arm spider 34 has apertured ends through which the tie rods pass and nuts 35 are threaded on the lower ends of the tie rods. Threaded shanks 36 and 37 project from the spiders 28 and 34 respectively and are engaged by cup nuts 38 and 39 respectively for holding the caps 21 and 24 in place and holding the cylinders 20 and 23 assembled on the core 5.

A bracket 40 is attached to the core 5 and may be attached to the front left hand corner 41 of an automobile as illustrated to advantage in Figure 1 so that the signal may be seen both from the front and rear and left or right sides of the automobile. This signal being formed with colored glass cylinders which may be illuminated can be seen by day or night both by pedestrians and drivers of automobiles.

This signal is very convenient to the driver as his intended turn, either to the right or left, would be made known to people in all directions, thus as he approaches the intersection, either by day or night, by simply turning a conveniently located switch to the right for a right turn, thus showing a green light or clear signal or by turning the switch to the left for a left hand turn thus showing a danger signal some shade of red or violet.

This danger signal might differ somewhat from the regular red tail or stop light if desired. This signal lamp should preferably be placed on an arm or bracket a little to the left of the side of the car so that the following driver can clearly see the same and a little above the hood and a little in front of the windshield so that people to the right, especially pedestrians crossing the street might know the car is to make a right hand turn.

The convenience and safety of my signal lamp can readily be appreciated from the fact that the driver can turn on his switch when approaching the intersection thus making known to people a block or more in all directions his intended turn, by the color light he shows, and at the same time have both hands free for the steering wheel, after making the turn he can throw off the signal by turning the switch to a central or neutral position, or the switch could be arranged to turn off automatically after the turn is made and the wheels straight.

This turning signal lamp will be especially convenient for closed cars in cold or stormy weather as the turn signals could be given without opening the window.

It is thought that the construction, utility and advantages of the invention will now be quite apparent to those skilled in this art without a more detailed description thereof.

The present embodiment of the invention has been disclosed in considerable detail merely for the purposes of exemplification since in actual practice, it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A signal device of the class described including a cylindrical core with a top plate and a bottom plate, said plates having central openings and off center apertures, a transparent cylinder rising from the top plate, transparent cylinder depending from the lower plate, caps on the ends of the transparent cylinders, a double lamp socket extending through the central openings, means for holding the socket in place, incandescent bulbs in the ends of the socket, a spider in the upper transparent cylinder, tie rods passing through apertures in the spider and through the apertures of the plate, having shoulders resting on the top plate, sleeves about the tie rods in the lower transparent cylinder, a spider on the lower end of the tie rods, nuts engaging the second mentioned spider on the tie rods, caps on the ends of the transparent cylinders, and means for attaching the caps to the spiders.

2. A signal device of the class described including a cylindrical core with a top plate and a bottom plate, said plates having central openings and off center apertures, a transparent cylinder rising from the top plate, transparent cylinder depending from the lower plate, caps on the ends of the transparent cylinders, a double lamp socket extending through the central openings, means for holding the socket in place, incandescent bulbs in the ends of the socket, a spider in the upper transparent cylinder, tie rods passing through apertures in the spider and through the apertures of the plate, having shoulders resting on the top plate, sleeves about the tie rods in the lower transparent cylinder, a spider on the lower end of the tie rods, nuts engaging the second mentioned spider on the tie rods, caps on the ends of the transparent cylinders, threaded shanks projecting from the spiders, and nuts extending through the centers of the caps and threadedly engaged on the shank.

3. A signal device of the class described including a cylindrical core with a top plate and a bottom plate, said plates having central openings and off center apertures, a transparent cylinder rising from the top plate, a transparent cylinder depending from the lower plate, caps on the ends of the transparent cylinders, a double lamp socket extending through the central openings, incandescent bulbs in the ends of the socket, tie rods passing through the apertures in the plates, and means cooperable with the tie rods for holding the caps and transparent cylinders in assembled relation.

4. A signal device of the class described comprising upper and lower open ended transparent cylinders, a core disposed between the adjacent ends of the cylinders for closing said ends of the cylinders, caps on the opposite ends of the cylinders, a double lamp socket extending centrally through the core, electric lamps on the ends of the socket and extending into the cylinder, a spider in the upper transparent cylinder, a spider in the lower cylinder, the tie rods passing through apertures in the spiders and through the core, means for securing the ends of the tie rods to the spiders, and means for attaching the caps to the spiders.

In testimony whereof I affix my signature.

BENNIE H. ALSOP.